(12) United States Patent
Barvosa-Carter et al.

(10) Patent No.: US 7,130,034 B2
(45) Date of Patent: Oct. 31, 2006

(54) METROLOGY SYSTEM AND METHOD FOR MEASURING FIVE DEGREES-OF-FREEDOM FOR A POINT TARGET

(75) Inventors: Bill Barvosa-Carter, Ventura, CA (US); Cameron Massey, Hawthorne, CA (US); Robert Emmett Doty, Los Angeles, CA (US); Guillermo Herrera, Winnetka, CA (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 10/833,199

(22) Filed: Apr. 26, 2004

(65) Prior Publication Data

US 2005/0235504 A1  Oct. 27, 2005

(51) Int. Cl.
*G01B 11/26* (2006.01)
*G01C 1/00* (2006.01)

(52) U.S. Cl. .............. 356/141.1; 356/128; 356/128.5; 33/547; 33/546

(58) Field of Classification Search ............. 356/141.1
See application file for complete search history.

(56) References Cited

U.S. PATENT DOCUMENTS

| | | | |
|---|---|---|---|
| 6,293,027 B1 * | 9/2001 | Elliott et al. | 33/546 |
| 2003/0151720 A1 * | 8/2003 | Chernyak et al. | 351/206 |
| 2004/0174542 A1 * | 9/2004 | Handman et al. | 356/622 |
| 2005/0254043 A1 * | 11/2005 | Chiba | 356/141.1 |

OTHER PUBLICATIONS

Bennett and Batroney, optical engineering, vol. 36 No. 7. Jul. 1997, pp. 1889-1892.*
Bennett and Batroney, Optical engineering, vol. 36 No. 7, Jul. 1997, pp. 1889-1892.
Das et al., Proc. of the 29th Conference on Decision and Control, Honolulu, Hawaii, Dec. 1990, p. 2018-2023.
Chen et al., Proc. SPIE vol. 3555, p. 305-310, Optical and Fiber Optic Sensor Systems, 1998.

* cited by examiner

*Primary Examiner*—Thomas H. Tarcza
*Assistant Examiner*—Luke D. Ratcliffe
(74) *Attorney, Agent, or Firm*—Ingrassia Fisher & Loronz, P.C.

(57) ABSTRACT

A metrology system includes a laser, a position sensitive detector array, a first collimator, a second collimator, and a mirror. The position sensitive detector array and the first collimator are positioned at a reference point. The second collimator and the mirror are positioned at a point target at a distance from the reference point. A laser beam is alternately provided to the first collimator and the second collimator by optical fiber. The position sensitive detector array measures position data from a first laser crosshair generated by the first collimator and from a second laser crosshair generated by the second collimator. By alternating the activation of the first collimator and the second collimator it is possible to measure 5 degrees-of-freedom for the point target. A metrology system processing unit provides analog data processing. The metrology system that is suitable for, but not limited to, facilitating active compensation of large spacecraft structures.

29 Claims, 11 Drawing Sheets

METROLOGY SYSTEM AND METHOD FOR MEASURING FIVE DEGREES-OF-FREEDOM FOR A POINT TARGET

BACKGROUND OF THE INVENTION

The present invention generally relates to metrology systems and, more particularly, to a metrology system that enables determination of the relative orientation of one point relative to another with five degrees-of-freedom and to a method for remotely measuring five degrees-of-freedom for a point target.

In an effort to enhance the performance and functionality of modern large space structures, such as satellites and other spacecraft, one class of structural designs increasingly features extended structures. Such structures may include large planar or boom-type structures that may have alignment-critical elements. In the case of widely spaced but structurally connected alignment-critical elements, however, it becomes increasingly difficult to maintain the alignment of the elements using rigid structural designs alone. Other means of compensating the deformation of the structure must be employed. However, in order to compensate for structural deformation, it must be measured. In many cases detailed deformation information is not needed. Instead the largest deformations often arise from lowest-order modes; the majority of the effects on the system may be deduced from measuring these modes, or at a minimum measurement of the relative orientation of critical components.

One example is the case of large fixed antenna reflectors and antenna feeds that lie at opposite ends of a boom connecting them. While increasing the size of the reflector and the spacing from the feed can increase antenna performance from an electromagnetic point of view, the required precision and stability of the structure becomes harder to maintain. For instance, the relative positioning between the reflector and feed components becomes increasingly difficult to maintain and/or control as the size of the space structure, and in particular the length of the boom and the size of the fixed antenna reflector, increases.

Additional concerns arise because the structure mass is limited by the launch vehicle's lift capacity. The desire is to maximize the utility of the mass that is launched; hence in the case of large fixed antenna structures, a fixed launch mass implies that increases in system performance come as the efficiency with which mass is utilized in the space structure is increased. Consequently, the mass density of the space structure is likely to drop and the dynamic stability of the resulting structure will decrease. As a result, more complex deformation modes will be introduced and will need to be compensated in order to maintain the desired performance gains. Any such distortion compensation system will require a high precision metrology system.

For many of the near-term projected distortion compensation problems, some of the existing metrology systems currently deployed on space structures may, with sufficient engineering, provide the needed measurement precision and accuracy. However, these systems have multiple implementation issues that limit their use. For instance, currently existing metrology systems may be relatively expensive and heavy, requiring extensive cabling between the metrology system and the remote point to be measured, scanning mirrors and motors. Furthermore, currently existing metrology systems may be complex to execute, for instance, requiring digital processing of the received data. However, while these systems may be able to meet near-term needs, the measurement precision and accuracy of currently existing metrology systems may not scale as well as will be needed to control future large space structures.

Prior art, for example, U.S. Pat. No. 6,293,027 B1 issued to Elliott et al., discloses a technique for measuring distortion of spacecraft structures in applications that require extremely precise dimensional relationships. The disclosed prior art system includes a first set of targets affixed to a spacecraft structure, a first target scanning module affixed to a reference point on a frame of reference that includes means for measuring a range and an angular position for each of the first set of targets, means for computing the orientation of the spacecraft structure relative to the frame of reference from the measured ranges and angular positions of the first set of targets, a second set of targets affixed to the spacecraft structure, a second scanning module affixed to a reference point on the spacecraft structure that includes means for measuring a range and angular position for each of the second set of targets, and means for computing shape distortion measurements pertaining to the spacecraft structure from the measured ranges and angular positions of the second set of targets. From this set of measurements, and a model for the geometrical and structural arrangement, measurement of two- or three-dimensional deformation of the structure can be made. The prior art system disclosed by Elliott et al. is relatively complex, including scanning mirrors that are rotated and therefore, may be prone to mechanical failure during operation in space. Furthermore, the geometrical arrangement of determining angular position of targets does not scale well as the size of the structure increases and, in general, such a scheme will have geometrically decreased accuracy at longer distances.

Prior art further includes, for example, a method for measuring inter-story drift in smart buildings using laser crosshair projection disclosed by Bennett and Batroney in Optical engineering, Vol. 36 No. 7, July 1997, pages 1889–1892. Bennett and Batroney utilize position sensitive photo detectors to determine the position of a laser generated crosshair. By applying this prior art method, the relative orientation of one point relative to another with 3 degrees-of-freedom can be determined. The 3 degrees-of-freedom are lateral translation in the x and y dimension, and roll rotation of one point relative to another. This system has the advantage that, as distances are increased, the measurement precision theoretically does not decrease; rather, only the range of displacement that can be measured on the detector decreases as the size of the laser-generated cross hair becomes increasingly diffuse at longer distances from the laser source. However, Bennett and Batroney neither consider, disclose, nor suggest measurement of the other degrees of freedom, such as pitch and yaw rotations of the target. Additionally, the method of Bennett and Bartroney may be unable to differentiate between lateral translations and rotations.

As can be seen, there is a need for a high-precision metrology system that can measure a plurality of degrees of freedom of low-order deformation modes, in order to facilitate active compensation of large spacecraft structures. Furthermore, there is a need for a metrology system that enables measurements of deformations of large space structures with alignment-critical elements deployed across increasingly high aspect-ratio mass efficient structures, for example, large spacecraft structures having a large fixed reflector connected with a boom and an antenna feed. Also, there is a need for a metrology system with measurement precision that scales well as structural size increases, and that provides a significant reduction in relative complexity and an improvement in robustness, as well as a higher performance with lower-cost components. Moreover, there is a need to provide a method for determining the relative orientation of one point relative to another with at least 5 degrees-of-freedom including lateral translation in x, y dimension as well as roll, pitch, and yaw rotation. In some circumstances, measurement of a sixth degree of freedom, distance z between two points, may also be desirable. Furthermore, there is a need to provide a method that enables differentiation between lateral translations and rotations.

SUMMARY OF THE INVENTION

The present invention provides a high precision metrology system that enables determination of the relative orientation of one point relative to another with 5 degrees-of-freedom. The present invention further provides a metrology system that is suitable for, but not limited to, facilitating active compensation of large spacecraft systems and structures. The present invention further provides a metrology system that may have a complimentary distant measurement system integrated to enable the measurement of a sixth degree-of-freedom. The present invention still further provides a method for remotely measuring 5 degrees-of-freedom for a point target.

In one aspect of the present invention, a metrology system comprises a laser, a first collimator, a mirror, a second collimator, and a position sensitive detector array. The laser alternately provides a first laser beam and a second laser beam. The first collimator receives the first laser beam from the laser and generates a first laser crosshair. The mirror receives and reflects the first laser crosshair. The second collimator receives the second laser beam from the laser and generates a second laser crosshair. The position sensitive detector array receives the first laser crosshair and the second laser crosshair. The first collimator and the position sensitive detector array are positioned at a reference point. The second collimator and the mirror are positioned at a point target distant from the reference point.

In another aspect of the present invention, a metrology system comprises a laser, a first collimator, a mirror, a second collimator, a position sensitive detector array, and a metrology system processing unit. The laser alternately provides a first laser beam and a second laser beam. The first collimator receives the first laser beam from the laser and generates a first laser crosshair. The mirror receives and reflects the first laser crosshair. The second collimator receives the second laser beam from the laser and generates a second laser crosshair. The position sensitive detector array receives the first laser crosshair and the second laser crosshair. The metrology system processing unit is connected with the position sensitive detector array and wherein the metrology system processes the position data. The first collimator and the position sensitive detector array are positioned at a reference point. The second collimator and the mirror are positioned at a point target distant from the reference point.

In still another aspect of the present invention, a metrology system comprises a laser, a first collimator, a mirror, a second collimator, a position sensitive detector array, and a metrology system processing unit. The laser alternately provides a first laser beam and a second laser beam. The first collimator receives the first laser beam from the laser and generates a first laser crosshair. The mirror receives and reflects the first laser crosshair. The second collimator receives the second laser beam from the laser and generates a second laser crosshair. The position sensitive detector array receives the first laser crosshair and the second laser crosshair. The metrology system processing unit is connected with the position sensitive detector array and wherein the metrology system processes the position data. The first collimator and the position sensitive detector array are positioned at a main body of a spacecraft structure. The second collimator and the mirror are positioned at the end of an antenna boom of a spacecraft structure.

In a further aspect of the present invention, a metrology system comprises a laser, a first collimator, a first optical fiber, a mirror, a second collimator, a second optical fiber, a position sensitive detector array, and a metrology system processing unit. The laser alternately provides a first laser beam and a second laser beam. The first collimator receives the first laser beam from the laser and generates a first laser crosshair. The first optical fiber feeds the first laser beam to the first collimator. The mirror receives and reflects the first laser crosshair. The second collimator receives the second laser beam from the laser and generates a second laser crosshair. The second optical fiber feeds the second laser beam to the second collimator. The position sensitive detector array receives the first laser crosshair and the second laser crosshair. The metrology system processing unit is connected with the position sensitive detector array and wherein the metrology system processes the position data. The laser, the first collimator, the position sensitive detector array, and the metrology system processing unit are positioned at a main body of a spacecraft structure. The first collimator and the position sensitive detector array are positioned at a reference point. The second collimator and the mirror are positioned at a point target at the end of an antenna boom of a spacecraft structure. The second optical fiber is positioned along the antenna boom.

In still a further aspect of the present invention, a spacecraft structure comprises a main body, an antenna boom, an antenna reflector, and a metrology system. The antenna boom is attached to the main body and extends the main body. The antenna reflector is attached to the antenna boom at the end opposite to the main body. The metrology system comprises a laser, a first collimator, a mirror, a second collimator, a position sensitive detector array, and a metrology system processing unit. The laser alternately provides a first laser beam and a second laser beam. The first collimator receives the first laser beam from the laser and generates a first laser crosshair. The mirror receives and reflects the first laser crosshair. The second collimator receives the second laser beam from the laser and generates a second laser crosshair. The position sensitive detector array receives the first laser crosshair and the second laser crosshair. The metrology system processing unit is connected with the position sensitive detector array and wherein the metrology system processes the position data. The laser, the first collimator, the position sensitive detector array, and the metrology system processing unit are positioned at the main body. The second collimator and the mirror are positioned at a point target at the antenna reflector at the end of an antenna boom of a spacecraft structure.

In still another aspect of the present invention, a method for remotely measuring 5 degrees-of-freedom for a point target comprises the steps of: feeding a first laser beam to a first collimator positioned at a reference point; generating a first laser crosshair with the first collimator; projecting the first laser crosshair against a mirror positioned at a point target; reflecting the first laser crosshair back to a position sensitive detector array positioned at the reference point; measuring position data of the first laser crosshair with the position sensitive detector array; feeding a second laser beam to a second collimator positioned at the point target;

generating a second laser crosshair with the second collimator; projecting the second laser crosshair against the position sensitive detector array; measuring position data of the second laser crosshair with the position sensitive detector array; and calculating x translation, y translation, roll, pitch, and yaw rotation for the point target relative to the reference point with the metrology system processing unit.

There has, therefore, arisen a need to provide a high precision metrology system that facilitates active compensation of large spacecraft structures. There has further arisen a need to provide a metrology system that makes it possible to determine the relative location and orientation of key elements of spacecraft structures including antenna systems with very large fixed antenna reflectors. There has still further arisen a need to provide a metrology system that enables space missions where high antenna gains, high powers, and extremely tight pointing budgets are required. There has also arisen a need to provide a metrology system that is less complex than existing systems and that can be manufactured and integrated with spacecraft systems at a lower cost. There has still further arisen a need to provide a method for determining the relative orientation of one point relative to another that is not limited to 3 degrees-of-freedom.

These and other features, aspects and advantages of the present invention will become better understood with reference to the following drawings, description and claims.

DETAILED DESCRIPTION OF THE INVENTION

Figure 1:
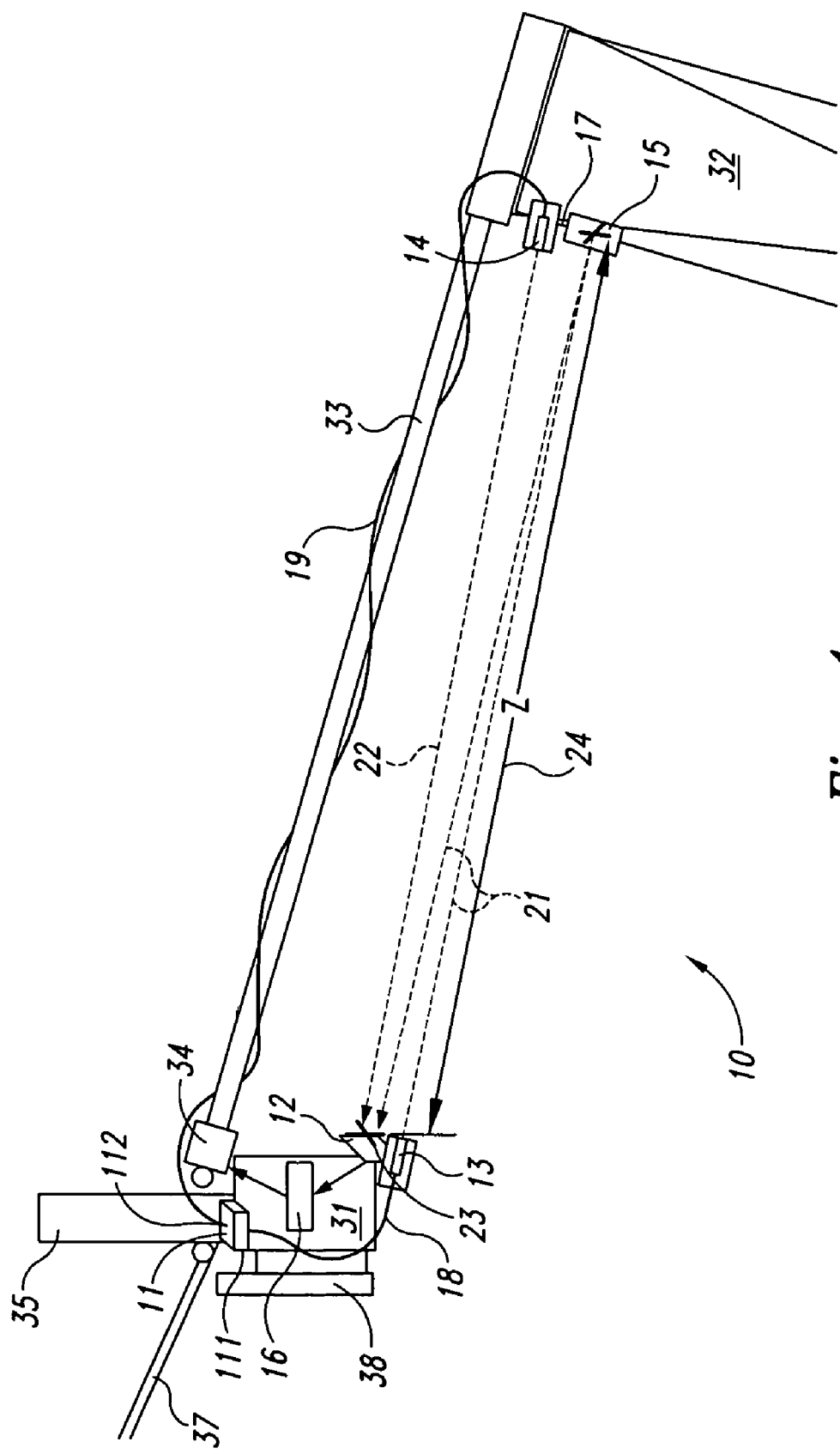
FIG. 1 is a schematic side view of a metrology system according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a metrology system that enables determination of the relative orientation of one point relative to another with five degrees-of-freedom. Contrary to the known prior art, the metrology system as in one embodiment of the present invention includes a second collimator that generates a second laser crosshair enabling differentiation of pitch and yaw rotation from translation and roll rotation. The metrology system as in one embodiment of the present invention may be used, for example, for large spacecraft systems and structures having a large fixed reflector to determine the location and orientation of key elements of the spacecraft structure. Other structural control situations where the metrology system, as described in one embodiment of the present invention, can be used may include the planarity control of phased arrays and instrument platforms which include multiple components which must remain aligned, such as phased arrays, feeds, and earth sensors. Furthermore, it will be possible to use the metrology system as in one embodiment of the present invention for inter-satellite alignment and spacing.

In one embodiment, the present invention provides a metrology system that includes a laser which alternately provides a first laser beam and a second laser beam, a first optical fiber fed collimator providing a first laser crosshair, a position sensitive detector array, and a metrology system processing unit, all attached to the main body of a spacecraft structure; as well as a second optical fiber fed collimator providing a second laser crosshair and a mirror, both attached to the antenna reflector of the spacecraft structure. By providing the second collimator, 5 degrees-of-freedom for a point target can be determined using one position sensitive detector array as sensor, which is not possible with prior art systems using only one collimator. By providing the second laser beam to the second collimator via optical fiber, only passive elements of the metrology system will be mounted onto the antenna reflector of a spacecraft structure, contrary to known prior art metrology systems. The sensor, the laser, and the processing unit of the metrology system according to one embodiment of the present invention are mounted onto the main body of the spacecraft. Therefore, the metrology system will be less sensitive to failure due to deployment than known prior art metrology systems. Furthermore, the wiring and cabling between the sensor and the remote point to be measured as well as data cabling as needed for known prior art metrology systems can be minimized or eliminated by introducing the metrology system as in one embodiment of the present invention. Also, scanning mirrors or motors, as utilized in current triangulation or laser tracking systems, can be eliminated. Therefore, the metrology system as in one embodiment of the present invention has a reduced complexity and an improved robustness compared to known prior art metrology systems used on spacecraft structures.

An embodiment of the present invention further provides metrology system processing unit that use fast analog methods for signal processing, which may be an advantage over, for example, prior art control electronics that use digital signal processing. By using lower-cost components, the metrology system according to one embodiment of the present invention can be manufactured and implemented at a lower cost than currently existing metrology systems. The metrology system according to one embodiment of the present invention may also be more robust when compared to digital signal processing systems.

An embodiment of the present invention further provides a complementary distance measurement system, such as a laser interferometer, integrated into the metrology subsystem as in one embodiment of the present invention to enable the measurement of a sixth degree-of-freedom, distance z between two points.

An embodiment of the present invention further provides a method for remotely measuring 5 degrees-of-freedom for a point target. By attaching only an optical-fiber-fed collimator and a mirror to the point target, for example, to a point target to be measured on the antenna reflector of a spacecraft structure at the end of the antenna boom, the orientation of the point target relative to the position sensitive detector array mounted onto the main body of the spacecraft structure can be measured remotely, which is not possible using prior art methods. Furthermore, by switching between two laser beams, 5 degrees-of-freedom for a point target can be determined using one position sensitive detector array as a sensor, which is not possible with prior art methods, which use only one laser beam.

Figure 10:
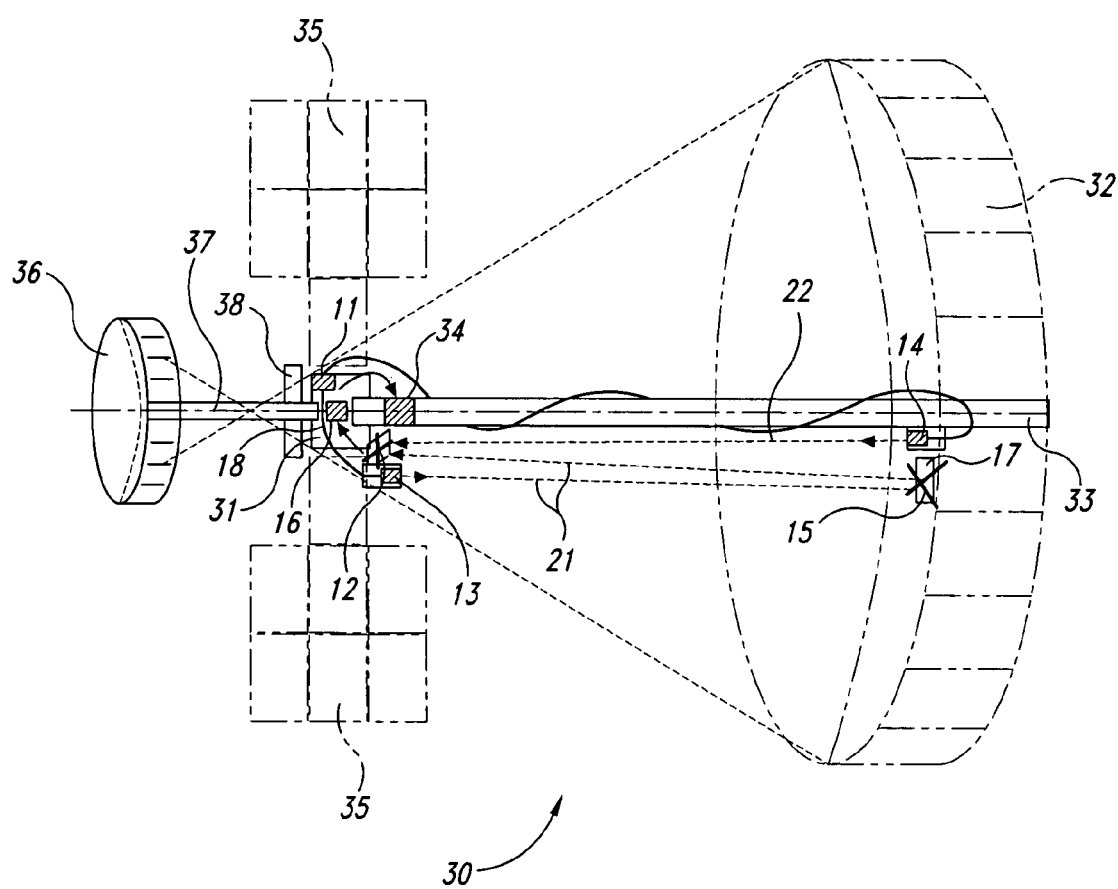
FIG. 10 is a perspective view of a spacecraft structure equipped with a metrology system according to another embodiment of the present invention.

Referring now to FIG. 1, a schematic side view of a metrology system 10 is illustrated according to one embodiment of the present invention. The metrology system 10 may include a laser 11, a position sensitive detector array 12, a first collimator 13, a second collimator 14, a mirror 15, and a metrology system processing unit 16. The metrology system 10 may be attached to a spacecraft structure 30 (shown in FIG. 10) that may include a main body 31, an antenna reflector 32, an antenna boom 33, and a pointing mechanism 34. The position sensitive detector array 12 and the first collimator 13 may be attached to a reference point 23 which is, for example, located at the main body 31 of a spacecraft structure 30, as shown in FIGS. 1 and 10. The laser 11 and the metrology system processing unit 16 may also be located on the main body of the spacecraft structure 30. The second collimator 14 and the mirror 15 may be attached to a point target 17 distant from the reference point 23, for example to the antenna reflector 32 at the end of the antenna boom 33, as shown in FIGS. 1 and 10. The laser 11 may alternately provide a first laser beam 111 and a second laser beam 112. The first laser beam 111 may be fed to the first collimator 13 by a first optical fiber 18. The second laser beam 112 may be fed to the second collimator 14 by a second optical fiber 19 positioned, for example, along the antenna boom 33. The laser 11 may be powered by a separate power source, such as a battery or a small set of solar panels. Furthermore, the second laser beam 112 may be projected from the reference point 23 to the point target 17, collected by an additional collimator positioned at the point target 17, focused onto a fiber, and re-projected from the second collimator 14. Still further, power may be projected by directing an additional laser onto a photocell, which in turn powers the second collimator 14 or by utilizing RF energy, for example, by using a rectenna. The first collimator 13 may generate a first laser crosshair 21 that may be projected against the mirror 15. The mirror 15 may reflect the first laser crosshair 21 back to the position sensitive detector array 12. The mirror 15 may have a passive reflective surface such as a polished metal surface deposited on a glass substrate or a thin glass mirror. The size of the mirror 15 should be sufficient that the first laser crosshair 21 may be always reflected back from the point target 17 to the position sensitive detector array 12 over the expected range of deformations. The second collimator 14 may generate a second laser crosshair 22 (also shown in FIGS. 2a and 2b). The second laser crosshair 22 may be projected from the point target 17 against the position sensitive detector array 12. The position sensitive detector array 12 may be operated as a sensor that outputs position data of the first laser crosshair 21 and the second laser crosshair 22. The first collimator 13 and the second collimator 14 may alternately project the first laser crosshair 21 and the second laser crosshair 22 against the position sensitive detector array 12 enabling differentiation of pitch and yaw rotation from lateral translation and roll rotation. The position sensitive detector array 12 may be coupled with the metrology system processing unit 16. The metrology system processing unit 16 may determine the position and orientation of the point target 17 relative to the reference point 23 with 5 degrees-of-freedom by using analog processing of the data received from the position sensitive detector array 12. The metrology system processing unit 16 may further be connected with a correction mechanism, such as the pointing mechanism 34 of a spacecraft structure 30 (also shown in FIG. 10). Since all active elements of the metrology system 10, such as the metrology system processing unit 16 and the position sensitive detector array 12 are placed in one location, for example, at the main body 31 of a spacecraft structure 30, and only passive elements of the metrology system such as the mirror 15 and the second collimator 14 are located at the point target 17, for example, at the end of an antenna boom 33, the 5 degrees-of-freedom for the point target 17 may be measured remotely.

Figure 2A:
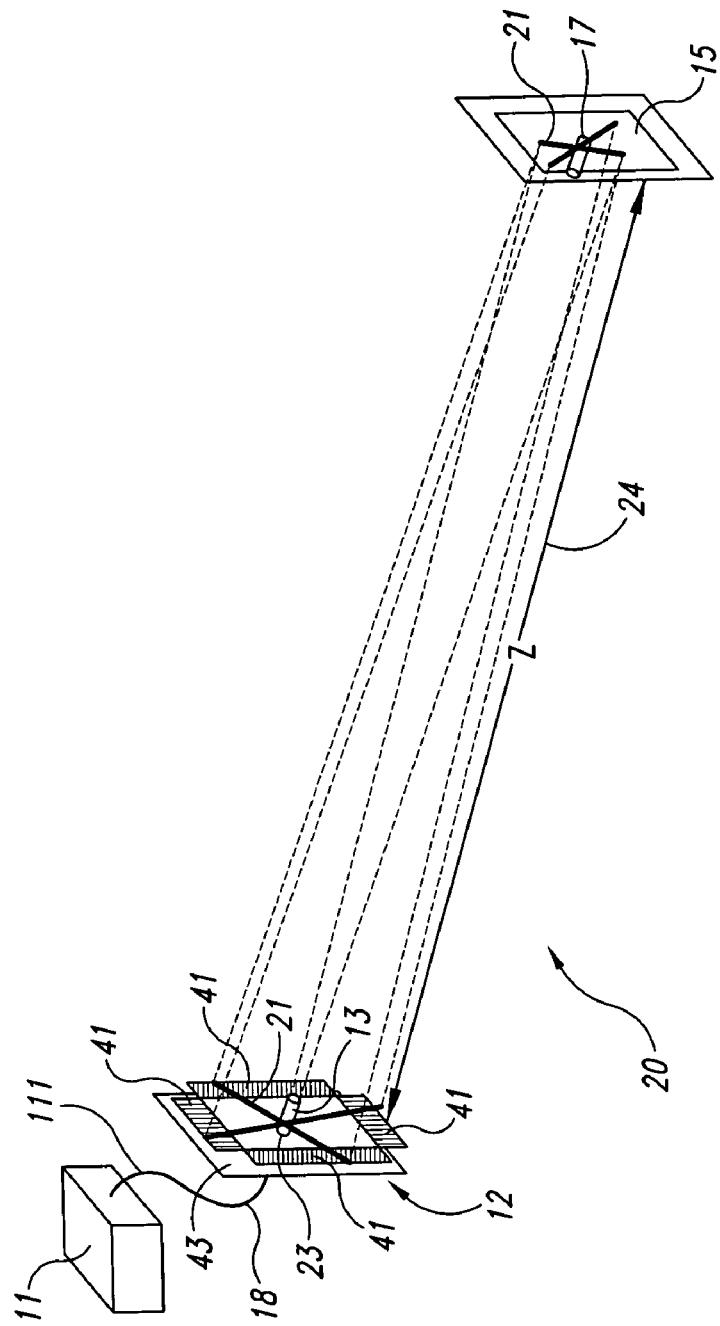
FIG. 2a is a perspective view of a first operation mode of a metrology subsystem according to one embodiment of the present invention.
Figure 2B:
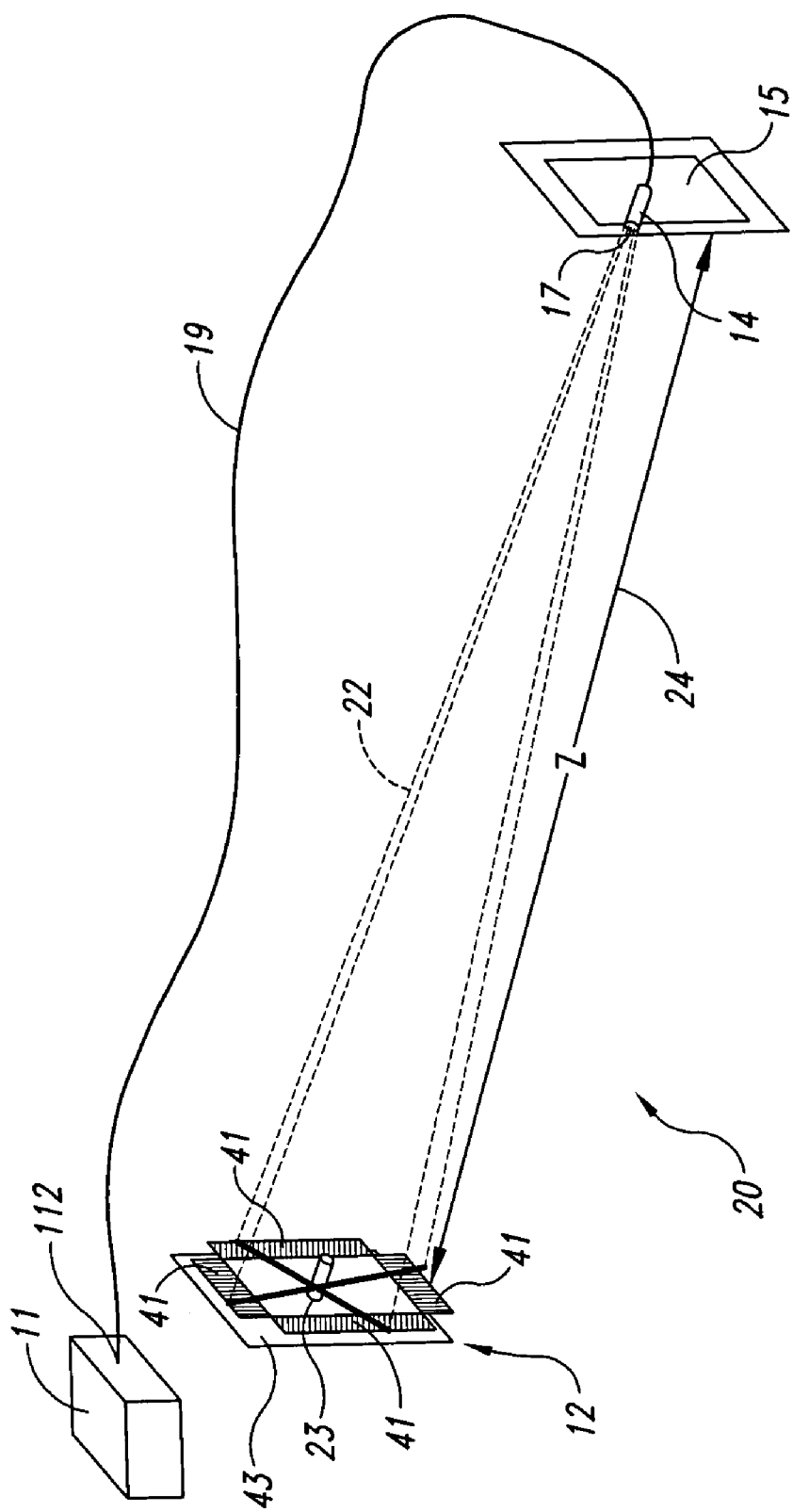
FIG. 2b is a perspective view of a second operation mode of a metrology subsystem according to one embodiment of the present invention.

Referring now to FIGS. 2a and 2b, a perspective view of a metrology subsystem 20 is illustrated according to one embodiment of the present invention. The metrology subsystem 20 may be the main component of the metrology system 10 as shown in FIG. 1. The metrology subsystem 20 may include a laser 11, a position sensitive detector array 12, a first collimator 13, a second collimator 14, a mirror 15, a first optical fiber 18, and a second optical fiber 19. The laser 11, the position sensitive detector array 12, and the first collimator 13, may be positioned at a reference point 23. The second collimator 14 and the mirror 15 may be positioned at the point target 17 at a distance from the reference point 23. The laser 11 may provide a first laser beam 111 that may be fed to the first collimator 13 via optical fiber 18. The laser 11 may provide a second laser beam 112 that may be fed to the second collimator 14 via optical fiber 18.

FIG. 2a illustrates a first operation mode of the metrology subsystem 20. The first collimator 13 may provide a first laser crosshair 21 that may be projected against the mirror 15 positioned at the point target 17. The first collimator may be positioned at the center of the position sensitive detector array 12, as shown in FIG. 2a, or in close proximity to the position sensitive detector array 12, as shown in FIG. 1. The mirror 15 may be a passive reflective surface of sufficient size such that the first crosshair may be always reflected back to the position sensitive detector array 12 over the expected range of deformations. The position sensitive detector array 12 may be operated as a sensor. Translations and rotations of the laser crosshair 21 due to position changes of the point target 17 may produce output changes in the position sensitive detector array 12.

FIG. 2b illustrates a second operation mode of the metrology subsystem 20. The second collimator 14 positioned at the point target 17 may provide a second laser crosshair 22 that may be projected against the position sensitive detector array 12. The second collimator 14 may be positioned in the center of the mirror 15 at the point target 17, as shown in FIG. 2b, or in close proximity to the mirror 15 at the point target 17, as shown in FIG. 1. Translations and rotations of the laser crosshair 22 due to position changes of the point target 17 may produce output changes in the position sensitive detector array 12. The first laser crosshair 21 and the second laser crosshair 22 may be alternately projected against the position sensitive detector array 12. By switching between the first operation mode, as shown in FIG. 2a, and the second operation mode, as shown in FIG. 2b, accurate measurements of 5 degrees-of-freedom of the point target 17 at the position sensitive detector array 12 may be possible. Therefore, it may be possible to distinguish between rotation and translation movements of the point target 17 and to determine the relative orientation of the point target 17 relative to the position sensitive detector array 12 with 5 degrees-of-freedom (x, y, roll, pitch, and yaw). Furthermore, by integrating a complementary distance measurement system, for example, a commercially available laser interferometer or laser tracker into the metrology subsystem 20 it may be possible to enable 6 degrees-of-freedom measurement of a point target 17. Using laser distance measurement in combination with the metrology subsystem 20 may enable the measurement of a distance z 24 between two points, for example, the point target 17 and the reference point 23 (as shown in FIGS. 1, 2a, 2b, and 10) in addition to the 5 degrees-of-freedom determined with the metrology subsystem 20. Laser distance measurement may be done by using, for example, pulse time of flight-ranging systems, beam-modulation telemetry, and interferometric methods. Other possible configurations may include the combination of the metrology subsystem 20 with a second metrology subsystem 20 that is able to measure 5 degrees-of-freedom or with any other metrology system, such as a 1 degree-of-freedom position sensitive detector system. In this latter case, distance would be inferred through triangulation.

Figure 3:
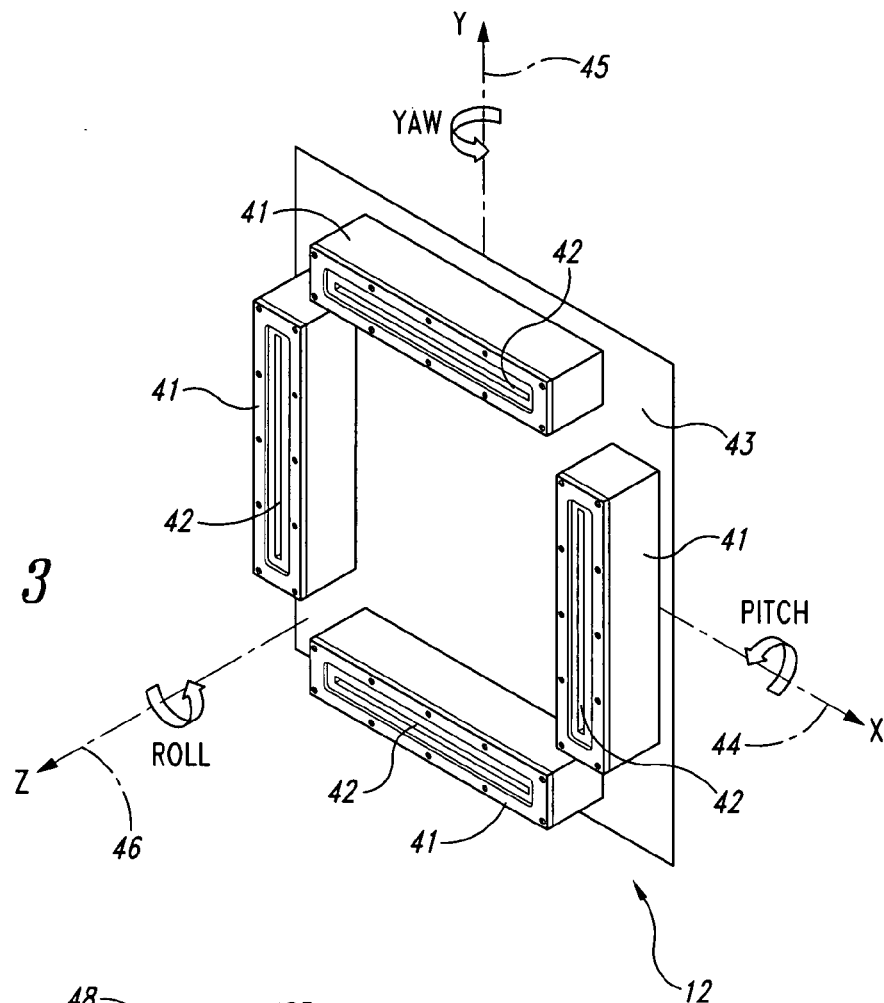
FIG. 3 is a perspective view of a position sensitive detector array in accordance with an embodiment of the present invention.

Referring now to FIG. 3, a perspective view of a position sensitive detector array 12 is illustrated according to one embodiment of the present invention. The position sensitive detector array 12 may include four one-dimensional duo-lateral position sensitive detectors 41 manufactured, for example, by UDT Sensors, Inc., California, U.S.A. Each position sensitive detector 41 may include an active area 42. Each active area may include a photo detector that outputs two voltages, which depend on the position at which the light of a laser crosshair (first laser crosshair 21, second laser crosshair 22) strikes the photo detector. Therefore, the four position sensitive detectors 41 may be used to determine the position of a laser crosshair, such as the first laser crosshair 21 and the second laser crosshair 22 (shown in FIGS. 1, 2a, and 2b), generated at the point target 17 (shown in FIGS. 1, 2a, and 2b) and projected against the position sensitive detector array 12. The four position sensitive detectors 41 may be placed on a reference frame 43 in a square formation, as shown in FIG. 1. The reference frame 43 may be mounted in a fixed position, for example, to the main body 31 of a spacecraft structure 30. FIG. 3 further illustrates 5 degrees-of-freedom, which may include lateral translation along x-axis 44 and along y-axis 45, and roll around z-axis 46 as well as yaw rotation around the y-axis 45 and pitch rotation around x-axis 44. If only one laser crosshair (such as the second laser crosshair 22, FIG. 2b) is projected against the position sensitive detector array 12 as done in prior art, for example, by Bennett and Batroney in Optical engineering, Vol. 36 No. 7, July 1997, pages 1889–1892, the relative position of a point target 17 relative to the position sensitive detector array 12 may be determined with only 3 degrees-of-freedom. The pitch and yaw rotation, as illustrated in FIG. 3, may not be differentiated from lateral translation along the x-axis 44 and along the y-axis 45 using known prior art methods that utilize only one crosshair. A second independent measurement using a second crosshair 22 may be required. Further, it may be possible to determine 5 degrees-of freedom for a point target 17 using a position sensitive detector array 12 that includes, for example, only three position sensitive detectors 41 arranged in a triangular formation on a reference frame 43. Since it may be possible to determine 5 degrees-of-freedom using only three position sensitive detectors 41, the fourth position sensitive detector 41 may be used in the metrology system 10, as illustrated in FIG. 1, for example, for redundancy, error correction, and to increase statistical data collection.

Figure 4:
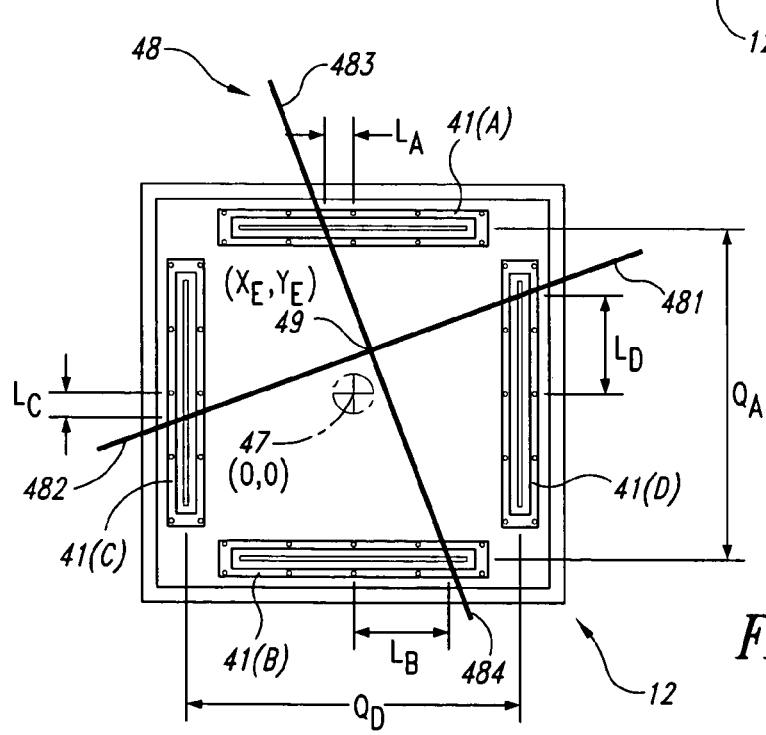
FIG. 4 is a front view of a position sensitive detector array in accordance with an embodiment of the present invention.

Referring now to FIG. 4, a front view of a position sensitive detector array 12 is illustrated according to one embodiment of the present invention. The position sensitive detector array 12 (as described in FIG. 3) may include four one-dimensional duo-lateral position sensitive detectors 41(A), 41(B), 41(C), and 41(D). Each position sensitive detector 41(A), 41(B), 41(C), and 41(D) may include an active area 42. The four position sensitive detectors 41(A), 41(B), 41(C), and 41(D) may be arranged in a square position around a center point (0,0) 47 on a reference frame 43. A laser crosshair 48 may be projected against the position sensitive detector array 12. Translations and rotations of the laser crosshair 48 may produce output changes in the position sensitive detector array 12 that may be uniquely related to those translations and rotations. Instead of the one-dimensional duo-lateral position sensitive detectors 41(A), 41(B), 41(C), and 41(D) two-dimensional position sensitive detectors may be used.

Further, the purpose of FIG. 4 is to support the calculations involved in determining the position and orientation of a point target 17 (x, y, roll, pitch, yaw) with the laser cross hair metrology system 10, as shown in FIG. 1. Position and angle of the laser crosshair 48 may be determined by measuring where the light of the laser crosshair intersects with the active areas 42 of the four position sensitive detectors 41(A), 41(B), 41(C), and 41(D). The calculations may be based on the prior art reference Bennett and Batroney in Optical engineering, Vol. 36 No. 7, July 1997, pages 1889–1892. The location of the laser crosshair 48 where it strikes each of the four position sensitive detectors 41(A), 41(B), 41(C), and 41(D) can be expressed as a ratio of the output voltages $V_1$ and $V_2$ of each of the position sensitive detectors 41(A), 41(B), 41(C), and 41(D), and a calibration coefficient associated with the length S of the position sensitive detectors 41(A), 41(B), 41(C), and 41(D). All four position sensitive detectors 41(A), 41(B), 41(C), and 41(D) may have the same length S.

$$L_{A,B,C,D} = S\left(\frac{V_2}{V_1 + V_2}\right)$$

Translations of the center point 49 of the laser crosshair 48 are calculated by detecting the location of the "legs" 481, 482, 483, and 484 of the laser crosshair 48 at the position sensitive detectors 41(A), 41(B), 41(C), and 41(D) and finding the intersection of the laser crosshair legs 481, 482, 483, and 484 at the center point 49 ($X_E$, $Y_E$) (FIG. 4):

$$X_E = \frac{L_C - \left[\frac{Q_A L_A}{L_A - L_B}\right] - Q_A}{\left(\frac{Q_A}{L_A - L_B}\right) - \left(\frac{L_D - L_C}{Q_D}\right)}$$

$$Y_E = \left(\frac{L_D - L_C}{Q_D}\right) X_E + L_C$$

To keep $X_E$ from becoming irrational, it can be restated:

$$X_E = \frac{(L_A - L_B)(L_C - Q_A) + Q_A L_A}{\left(Q_A - \frac{(L_A - L_B)(L_D - L_C)}{Q_D}\right)}$$

The angle of each leg 481 and 482 of the laser crosshair 48 can be represented as $$\psi'_{twist} = \tan^{-1}\left(\frac{X_1 - X_E}{Q_D/2 - Y_E}\right),$$

relative to the x-axis 44 (FIG. 3), and for the transverse legs 483 and 484

$$\psi'_{twist} = \tan^{-1}\left(\frac{Y_1 - Y_E}{Q_A/2 - X_E}\right),$$

relative to the y-axis 45 (FIG. 3).

With $X_E$, $Y_E$ defined it may be possible to calculate pitch and yaw directly from the laser crosshair 21 generated by the first collimator 13. The rotation of the point target 17 may be the same as the angle of incidence for the reflected laser crosshair 21; therefore, the measured translation will represent twice the actual rotation. Where P may be the distance from the point target 17 to the position sensitive detector array 12 (FIG. 1, 2a, 2b), $$\text{Pitch: } \theta = \frac{1}{2}\tan^{-1}\left(\frac{Y_E}{P}\right)$$

$$\text{Yaw: } \phi = \frac{1}{2}\tan^{-1}\left(\frac{X_E}{P}\right)$$

This assumes that the system is calibrated at the center point 47 of the position sensitive detector array 12 ($X_E$, $Y_E$)=(0, 0).

From the laser crosshair 22 generated by the second collimator 14, the x, y translations and the twist (roll,ψ) are determined when pitch and yaw are taken into account:

$$X_{target} = X_E - P \sin(\phi), \text{ and alternately}$$

$$X_{target} = X_{E2} - \frac{X_{E1}}{2},$$

where E1 and E2 refer to the first laser crosshair 21 and the second laser crosshair 22 respectively.

$$Y_{target} = Y_E - P\sin(\theta)$$

$$Y_{target} = Y_{E2} - \frac{Y_{E1}}{2}$$

For the true twist of the point target 17, the distortions due to pitch and yaw are also taken into account:

$$\psi = \tan^{-1}\left(\frac{\theta}{\phi}\right) + \tan^{-1}\left[\tan\left(\psi'_{twist} - \tan^{-1}\left[\frac{\theta}{\phi}\right]\right)\cos\left(\sqrt{\theta^2 + \phi^2}\right)\right]$$

Figure 5:
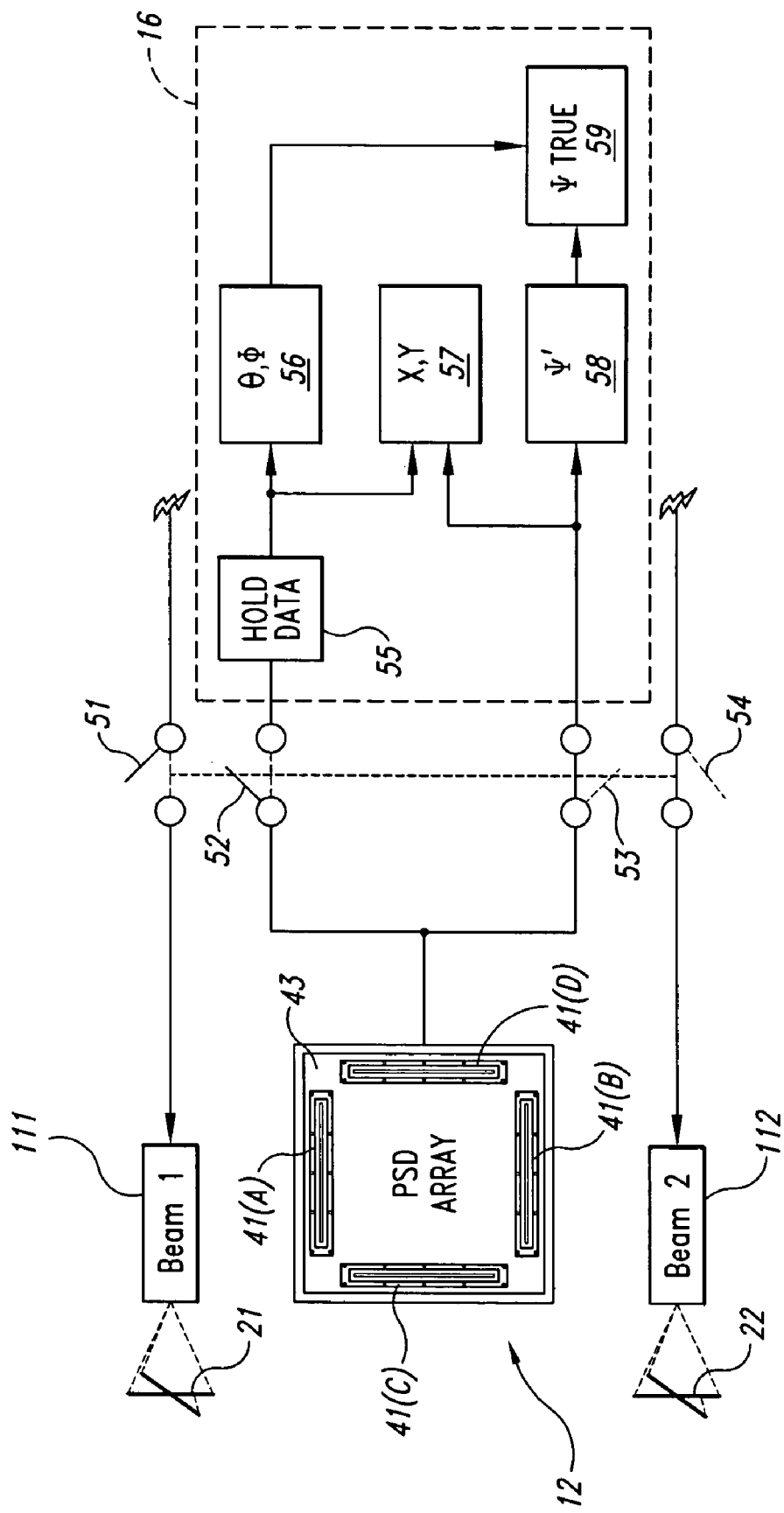
FIG. 5 is a simplified operational diagram of a metrology system according to one embodiment of the present invention.

Referring now to FIG. 5, a simplified operational diagram of the metrology system 10 is illustrated according to one embodiment of the present invention. The first laser beam 111 provided by the laser 11 (FIGS. 1, 2a, 2b), the second laser beam 112 provided by the laser 11 (FIGS. 1, 2a, 2b), the first laser crosshair 21 generated by the first collimator 13 (FIGS. 1, 2a, 2b), the second laser crosshair 22 generated by the second collimator 14 (FIGS. 1, 2a, 2b), the position sensitive detector array 12, and the metrology system processing unit 16 are illustrated in FIG. 5 as main components for the data collection and computation. The position sensitive detector array 12 may include four position sensitive detectors 41(A), 41(B), 41(C), and 41(D) that measure the position and orientation of the first laser crosshair 21 and of the second laser crosshair 22, both coming from the point target 17 (FIGS. 1, 2a, 2b). The metrology system processing unit 16 may include a sample-and-hold circuit 55 and circuitry 56, 57, 58, and 59. Switches 51, 52, 53, and 54 may connect the laser 11 (FIGS. 1, 2a, 2b) providing laser beam 111 and laser beam 112 and the position sensitive detector array 12 with the metrology system processing unit 16. The switch 51 may activate the laser 11 (FIGS. 1, 2a, 2b) to provide the first laser beam 111 to the first collimator 13 that generates the first laser crosshair 21. The switch 54 may activate the laser 11 (FIGS. 1, 2a, 2b) to provide the second laser beam 112 to the second collimator 14 that generates the second laser crosshair 22. The switch 52 may connect the position sensitive detector array 12 with the sample-and-hold circuit 55 providing the position data $X_1$ and $Y_1$ from the position sensitive detectors 41(A) and 41(C), respectively. The switch 53 may connect the position sensitive detector array 12 with the circuitry 57 and 58 providing the position data $X_2$ and $Y_2$ from the position sensitive detectors 41(B) and 41(D), respectively. The switches 51, 52, 53, and 54 may be operated such that if switch 51 and switch 52 are open the switches 53 and 54 are closed and verse visa, as shown in FIG. 5. All switches 51, 52, 53, and 54 may be operated at the same time. Consequently, only the laser crosshair 21 or the laser crosshair 22 will be generated at a time and therefore, position data of the point target 17 (FIGS. 1, 2a, 2b) will be collected alternating from the first laser crosshair 21 and the second laser crosshair 22. The position data $X_1$ and $Y_1$ from the position sensitive detectors 41(A) and 41(C) may be stored by the sample-and-hold circuit 55 until the position data $X_2$ and $Y_2$ from the position sensitive detectors 41 (B) and 41(D) are available. The combined position data ($X_{E1}$, $Y_{E1}$, $X_{E2}$, $Y_{E2}$) may than be provided to the circuitry 56, 57, 58 and 59 that may allow for analog processing of the data according to the calculations described in FIG. 4. As a result the true twist of the point target 17 (FIGS. 1, 2a, 2b) may be determined.

Figure 6:
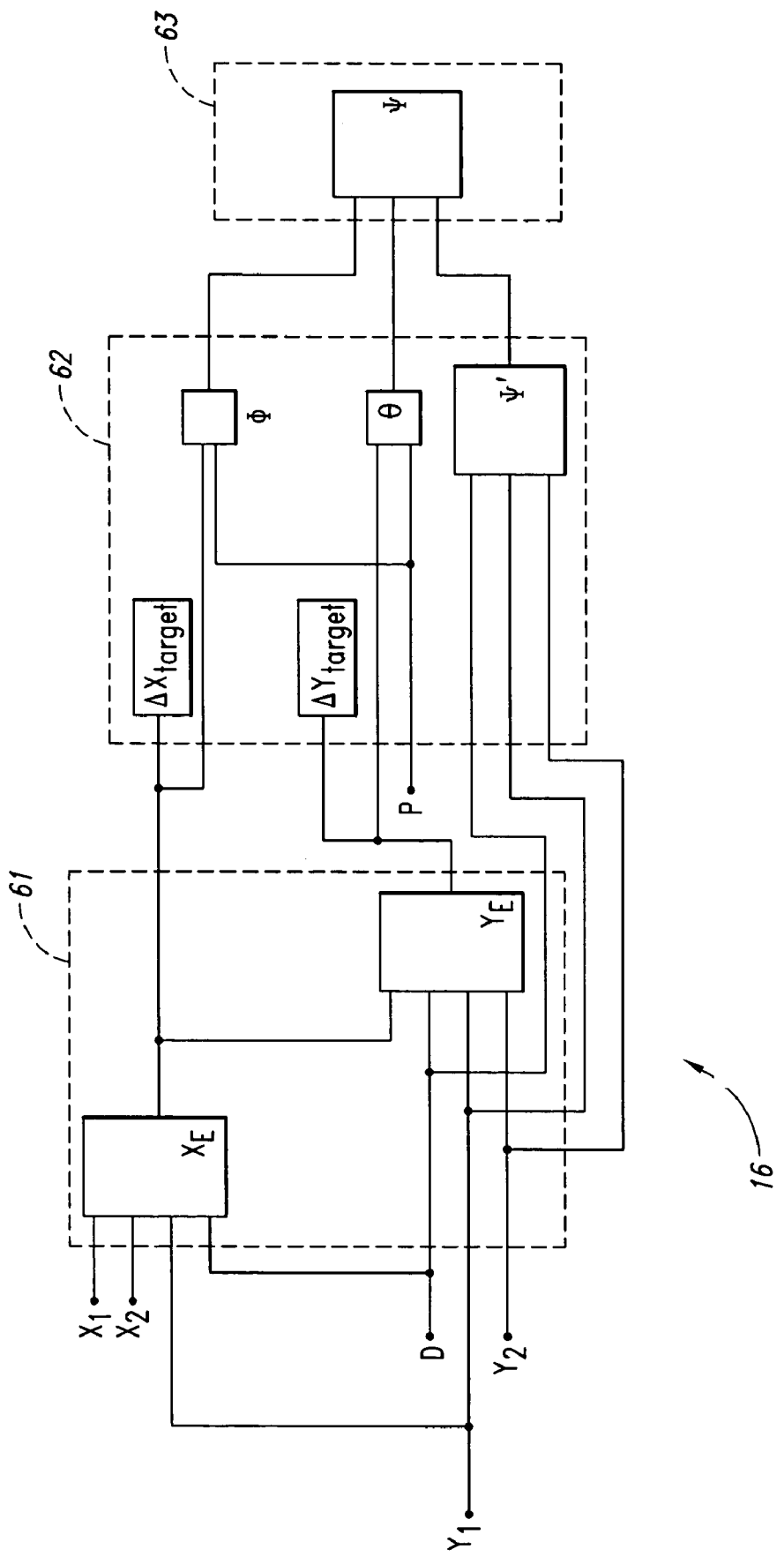
FIG. 6 is a simplified block diagram of a metrology system processing unit of the metrology system according to one embodiment of the present invention.

Referring now to FIG. 6, a simplified block diagram of the metrology system processing unit 16 of the metrology system 10 (FIGS. 1 and 5) is illustrated according to one embodiment of the present invention. The metrology system processing unit 16 may be connected to the position sensitive detector array 12 and may include three modules 61, 62, and 63. In module 61 the center point 49 (FIG. 4) of the first laser crosshair 21 ($X_{E1}$, $Y_{E1}$) and the center point 49 (FIG. 4) of the second laser crosshair 22 ($X_{E2}$, $Y_{E2}$) may be calculated as described with FIG. 4. In module 62 the x translation ($X_{target}$), the y translation ($Y_{target}$), roll, yaw, and pitch may be determined as described with FIG. 4. With all these data now available the true twist of the point target 17 (FIGS. 1, 2a, 2b) relative to the position sensitive detector array 12 may be calculated in module 63 as described with FIG. 4. Further modules may be added.

Figure 7:
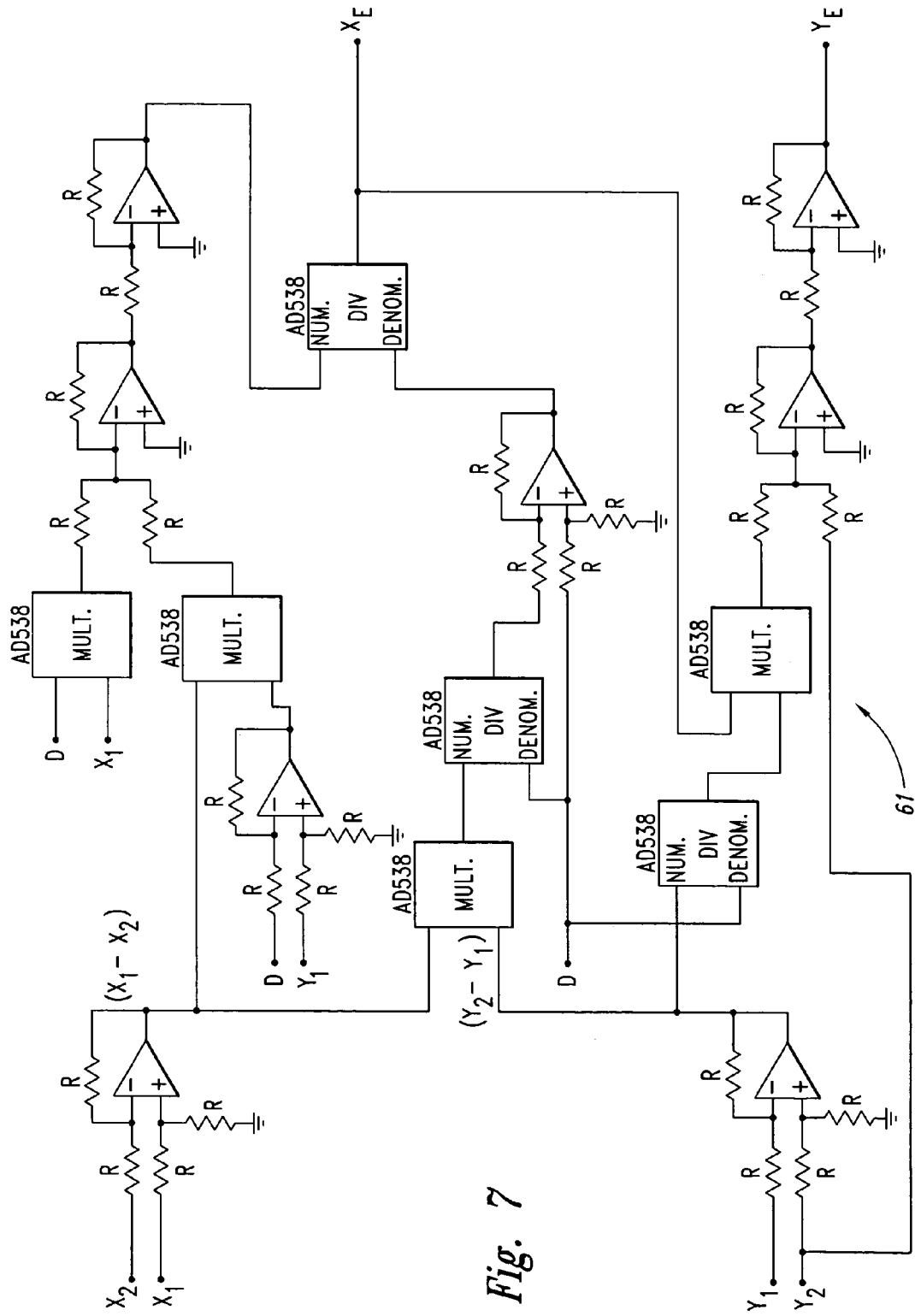
FIG. 7 is a simplified circuit diagram of a first module of the metrology system processing unit according to one embodiment of the present invention.
Figure 8:
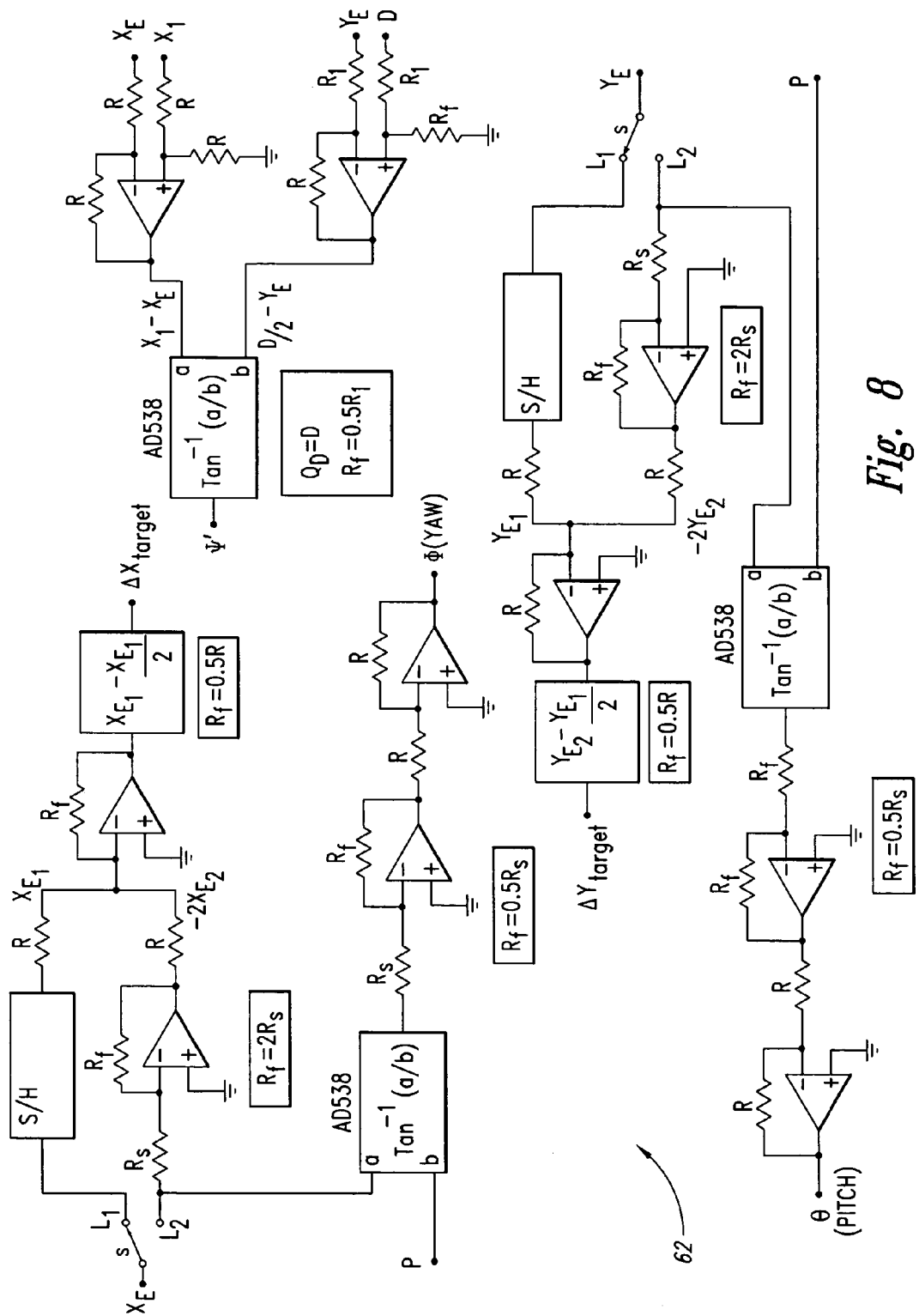
FIG. 8 is a simplified circuit diagram of a second module of the metrology system processing unit according to one embodiment of the present invention.
Figure 9:
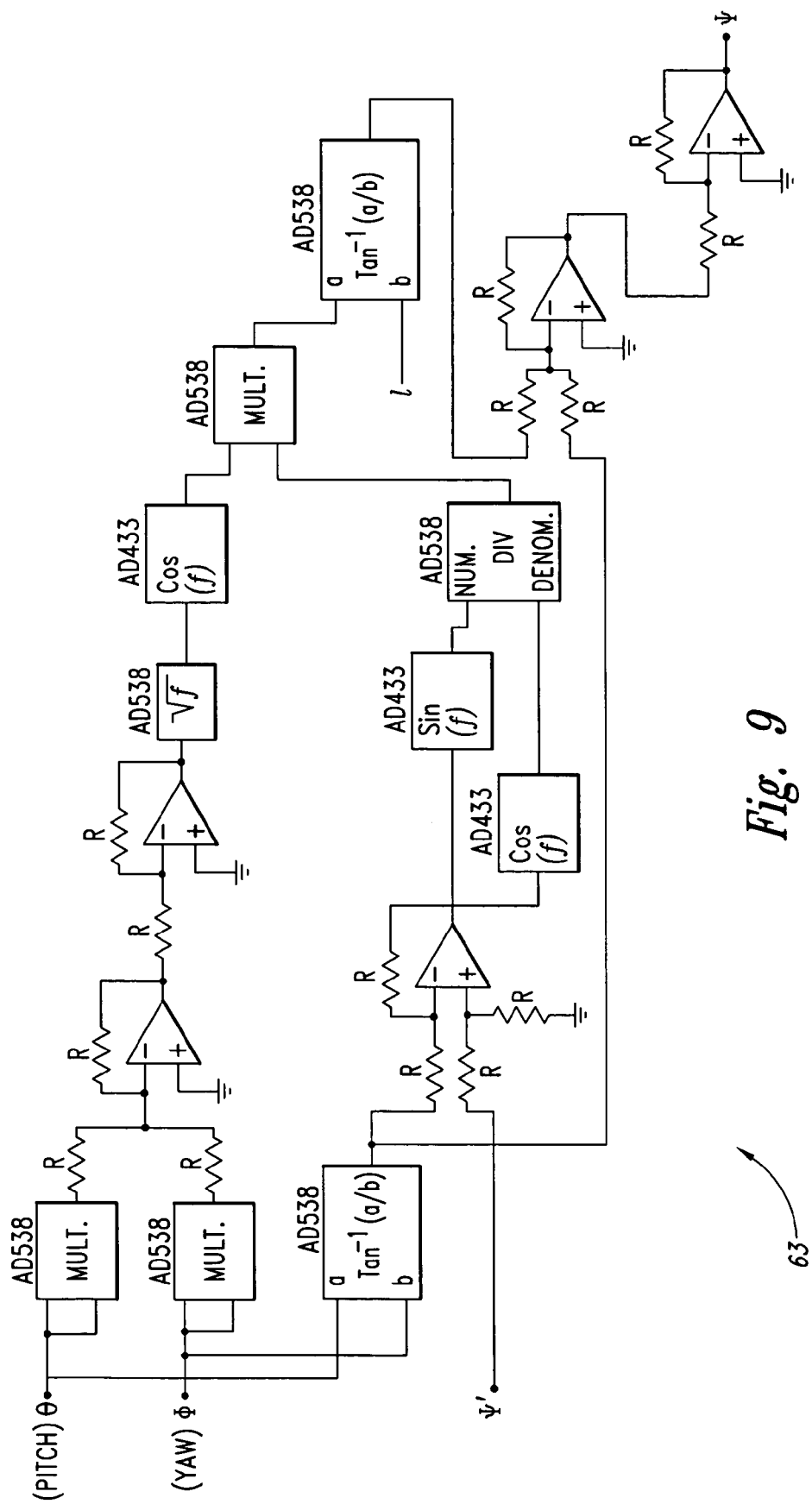
FIG. 9 is a simplified circuit diagram of a third module of the metrology system processing unit according to one embodiment of the present invention.

Referring now to FIGS. 7, 8, and 9, simplified circuit diagrams of the modules 61, 62, and 63 of the metrology system processing unit 16 are illustrated, respectively, according to one embodiment of the present invention. Illustrated are top level schematics that may allow for analog processing of the data received by the position sensitive detector array 12 (FIGS. 1, 2a, 2b). Necessary filter elements, feedback loops, and impedance-matching circuitry, for example, are not shown. Unless otherwise indicated, all amplifiers have unity gain. Thus, all input and feedback resistors may be of equal values for a given amplifier. Resistors do not necessarily have the same value throughout the circuit. "D" and "P" are voltage equivalents for the diameter of the position sensitive detector array 12 (FIGS. 3 and 4) and the laser path length, respectively. In module 61 (FIG. 7), the outputs from the position sensitive detector array 12 may be used to evaluate the center point 49 (FIG. 4) of the first laser crosshair 21 and the second laser crosshair 22. In module 62 (FIG. 8), x translation, y translation, pitch, yaw, and measured roll may be calculated. In module 63 (FIG. 9), the true twist of the point target 17 (FIGS. 1, 2a, 2b) may be calculated. Analog processing of the data, as illustrated in FIGS. 7, 8, and 9, may provide a less complex and more robust alternative to digital processing as currently used. Still, it may be possible to use a metrology system processing unit 16 that enables digital data processing.

Referring now to FIG. 10, a perspective view of a spacecraft structure 30 equipped with the metrology system 10 (FIGS. 1 and 5) is illustrated according to another embodiment of the present invention. The spacecraft structure 30 may include a main body 31, an antenna reflector 32, an antenna boom 33, solar arrays 35, a subreflector 36, a subreflector boom 37, and an array feed 38. The solar arrays 35 and the array feed 38 may be attached to the main body 31. The antenna boom 33 may be connected with the main body 30 extending the main body 31 in one direction and having the antenna reflector 32 attached in a fixed position at the end opposite from the main body 31. The subreflector boom 37 may be connected with the main body 31 extending the main body 30 in the opposite direction as the antenna boom 33 and having the subreflector 36 attached in a fixed position at the end opposite to the main body 30. Positioning between elements of the spacecraft structure 30 such as the antenna reflector 32 and the array feed 38 that lie at opposite ends of the antenna boom 33 connecting them becomes increasingly important to control as the size of the spacecraft structure 30, and in particular the size of the fixed antenna reflector 32, increases. The antenna boom 33 that connects the antenna reflector 32 to the main body 31 of the spacecraft structure 30 may act as a long cantilever allowing the antenna reflector 32 to rotate around three axes as well as to translate primarily along the two axes perpendicular to the antenna boom 33. Therefore, it may be necessary to measure 5 degrees-of-freedom to capture the primary deformation modes of the antenna boom 33. By equipping the spacecraft structure 30 with the metrology system 10 according to one embodiment of the present invention and as shown in FIGS. 1 and 5 accurate knowledge of the relative orientation of structural elements of the spacecraft structure 30 to each other may be obtained and the far-field radiation pattern may then be compensated by existing mechanism and array feeds, such as the pointing mechanism 34 attached to the main body 31. For example, by positioning the metrology system 10 on the spacecraft structure 30 as shown in FIGS. 1 and 10 it may be possible to determine the relative orientation of the antenna reflector 32 relative to the main body 31 with 5 degrees-of-freedom (x, y, roll, pitch, and yaw). As illustrated in FIGS. 1 and 10, the laser 11, the position sensitive detector array 12, and the first collimator 13 may be attached to the main body 31 of the spacecraft structure 30 whereas the mirror 15 and the second collimator 14 may be attached to the point target 17, for example, at the end of the antenna boom 33 where the antenna reflector 32 is attached. Therefore, it may be possible to measure relative orientation changes between the main body 30 and the opposite end of the antenna boom 33 supporting the antenna reflector 32. It may further be possible to use the metrology system 10 in conjunction with currently existing 2 degrees-of-freedom measurements along the circumference of the antenna reflector to determine the sense of distortions, such as distortions of the reflector aperture geometry. The metrology system 10 may be suitable for facilitating active compensation of large spacecraft structures, such as spacecraft structure 30, by providing deformation information to an active compensation system. The active compensation of the spacecraft structure 30 may include electronic control of the antenna feed, changes in spacecraft orientation, as well as gross (i.e. relative positioning) and fine (i.e. distributed deformation compensation) control over the structural shape of the spacecraft 30. The application of the metrology system 10 is not limited to measurements on large antenna boom 33—antenna reflector 32 assemblies. Other structures, for example, a spacecraft structure 30 having several combined operating large antenna reflectors 32 or a plurality of spacecraft structures 30 that are operating together, may be able to benefit from the application of the metrology system 10.

Figure 11:
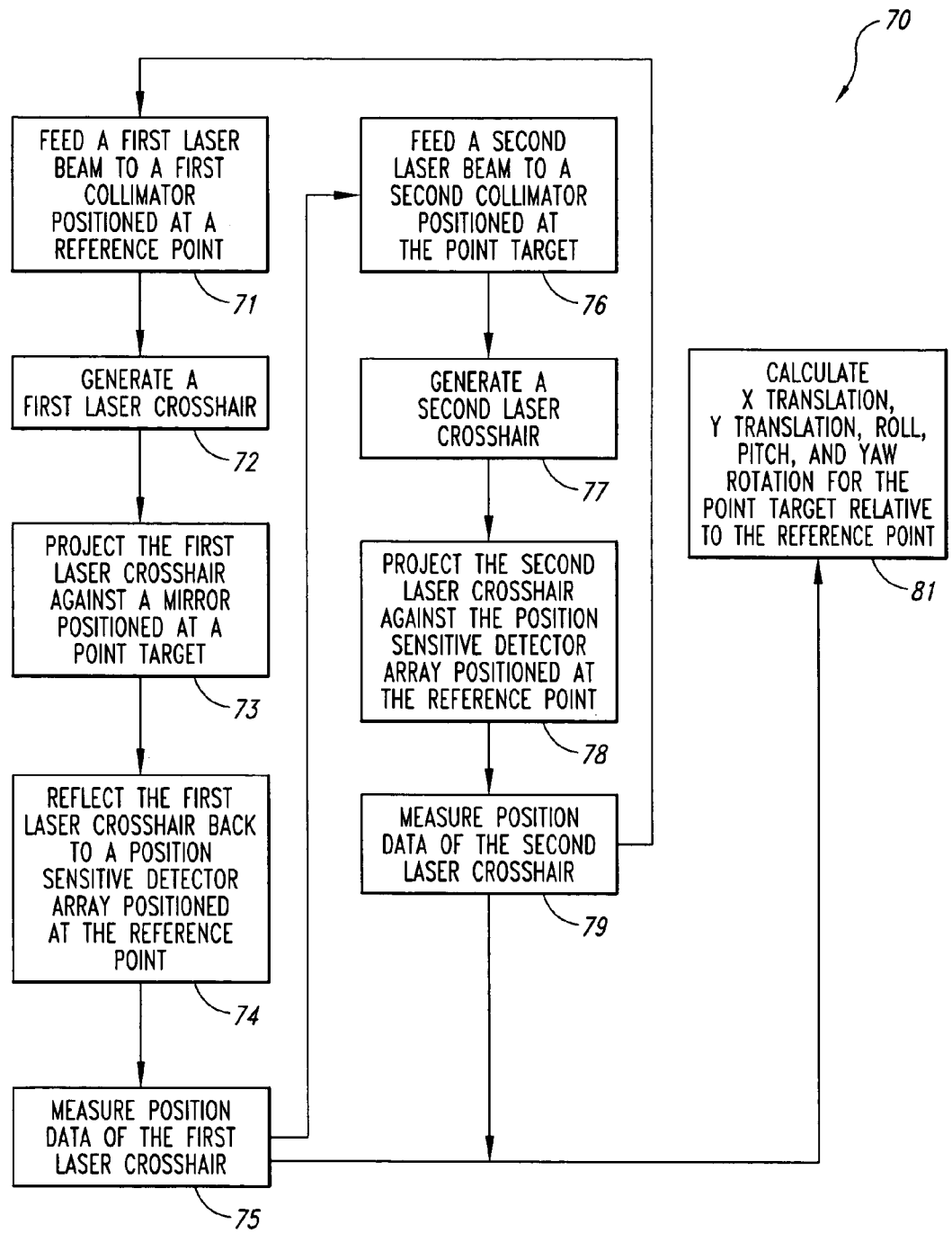
FIG. 11 is a flow chart of a method for remotely measuring five degrees-of-freedom for a point target according to another embodiment of the present invention.

Referring now to FIG. 11, a flow chart of a method 70 for remotely measuring five degrees-of-freedom for a point target 17 is illustrated according to another embodiment of the present invention. The method 70 for remotely measuring five degrees-of-freedom for a point target 17 (also shown by arrows in FIG. 1) may include the steps of: providing a metrology system 10 including a laser 11, a the position sensitive detector array 12, a first collimator 13, a second collimator 14, a mirror 15, a metrology system processing unit 16, a first optical fiber 18, and a second optical fiber 19; positioning the laser 11, the position sensitive detector array 12, and the first collimator 13 at a reference point 23; positioning the mirror 15 and the second collimator 14 at a point target 17; connecting the laser 11 with the first collimator 13 using the first optical fiber 18; connecting the laser 11 with the second collimator 14 using the second optical fiber 19; activating the first collimator 13 by providing a first laser beam 111 to the first collimator 13 (step 71); generating a first laser crosshair 21 with the first collimator 13 (step 72); projecting the first laser crosshair 21 against the mirror 15

(step 73); reflecting the first laser crosshair 21 at the mirror 15 back to the position sensitive detector array 12 (step 74); measuring position data of the first laser crosshair 21 with the position sensitive detector array 12 (step 75); storing the position data in a the sample-and-hold circuit 55 of the metrology system processing unit 16; activating the second collimator 14 by providing a second laser beam 112 to the second collimator 14 (step 76); generating a second laser crosshair 22 with the second collimator 14 (step 77); projecting the second laser crosshair 2 against the position sensitive detector array 12 (step 78); measuring position data of the second laser crosshair 22 with the position sensitive detector array 12 (step 79); combining data from second laser crosshair 22 with data from first laser crosshair 21; calculating 5 degrees-of-freedom for the point target 17 with the metrology system processing unit 16; determining the true twist of the point target 17 relative to the reference point 23 (step 81); and alternating between activating the first collimator 13 (step 71) and the second collimator 14 (step 76). The reference point 23 may be the main body 31 of a spacecraft structure 30 and the point target may be the end of an antenna boom 33 connecting an antenna reflector 32 with the main body 31. The method for remotely measuring five degrees-of-freedom for a point target 17 may further include the steps of: providing the position data to a pointing mechanism and adjusting the position of the antenna boom 33 and the antenna reflector 32 as needed. By exploiting geometry the method for measuring five degrees-of-freedom for a point target as in one embodiment of the present invention may enable measurement of important deformations that are difficult to measure by other methods. The deformations that may be measured, for example, for a large spacecraft structure 30 may include dynamic deformations, such as low-order low-strain deformations that may arise from dynamic fundamental or first-order vibration modes as well as slow diurnal deformations that may arise from cyclic thermal equilibration. Although the metrology system 10 and the method for remotely measuring five degrees-of-freedom for a point target 17 have been described for spacecraft structures 30 having a large antenna reflector 32 other applications may be possible.

It should be understood, of course, that the foregoing relates to preferred embodiments of the invention and that modifications may be made without departing from the spirit and scope of the invention as set forth in the following claims.

We claim:

1. A metrology system, comprising:
   a laser, wherein said laser alternately provides a first laser beam and a second laser beam;
   a first collimator, wherein said first collimator receives said first laser beam from said laser and generates a first laser crosshair;
   a mirror, wherein said mirror receives and reflects said first laser crosshair;
   a second collimator, wherein said second collimator receives said second laser beam from said laser and generates a second laser crosshair; and
   a position sensitive detector array, wherein said position sensitive detector array receives said first laser crosshair and said second laser crosshair;
   wherein said first collimator and said position sensitive detector array are positioned at a reference point; and
   wherein said second collimator and said mirror are positioned at a point target distant from said reference point.

2. The metrology system of claim 1, further comprising a first optical fiber, wherein said first optical fiber feeds said first laser beam to said first collimator.

3. The metrology system of claim 1, further comprising a second optical fiber, wherein said second optical fiber feeds said second laser beam to said second collimator.

4. The metrology system of claim 1, further comprising a metrology system processing unit, wherein said metrology system processing unit is connected with said position sensitive detector array.

5. The metrology system of claim 4, wherein said metrology system processing unit determines the position and orientation of said point target relative to said reference point with 5 degrees-of-freedom.

6. The metrology system of claim 4, wherein said metrology system processing unit enables analog data processing.

7. The metrology system of claim 4, wherein said metrology system processing unit enables digital data processing.

8. A metrology system, comprising:
   a laser, wherein said laser alternately provides a first laser beam and a second laser beam;
   a first collimator, wherein said first collimator receives said first laser beam from said laser and generates a first laser crosshair;
   a mirror, wherein said mirror receives and reflects said first laser crosshair;
   a second collimator, wherein said second collimator receives said second laser beam from said laser and generates a second laser crosshair;
   a position sensitive detector array, wherein said position sensitive detector array receives said first laser crosshair and said second laser crosshair and wherein said position sensitive detector array outputs position data of the first laser crosshair and the second laser crosshair; and
   a metrology system processing unit, wherein said metrology system processing unit is connected with said position sensitive detector array and wherein said metrology system processes said position data;
   wherein said first collimator and said position sensitive detector array are positioned at a reference point; and
   wherein said second collimator and said mirror are positioned at a point target distant from said reference point.

9. The metrology system of claim 8, wherein said position sensitive detector array comprises four one-dimensional duo-lateral position sensitive detectors that are placed on a reference frame in a square formation.

10. The metrology system of claim 8, wherein said position sensitive detector array comprises three one-dimensional duo-lateral position sensitive detectors that are placed on a reference frame in a triangular formation.

11. The metrology system of claim 8, wherein said first collimator is positioned in the center of said position sensitive detector array.

12. The metrology system of claim 8, wherein said first collimator is positioned in close proximity to said position sensitive detector array.

13. The metrology system of claim 8, wherein said second collimator is positioned in the center of said mirror.

14. The metrology system of claim 8, wherein said second collimator is positioned in close proximity to said mirror.

15. The metrology system of claim 8, wherein said reference point is located at a main body of a spacecraft structure.

16. The metrology system of claim 8, wherein said point target is located at an antenna reflector at the end of an antenna boom of a spacecraft structure.

17. A metrology system, comprising:
a laser, wherein said laser alternately provides a first laser beam and a second laser beam;
a first collimator, wherein said first collimator receives said first laser beam from said laser and generates a first laser crosshair;
a mirror, wherein said mirror receives and reflects said first laser crosshair;
a second collimator, wherein said second collimator receives said second laser beam from said laser and generates a second laser crosshair;
a position sensitive detector array, wherein said position sensitive detector array receives said first laser crosshair and said second laser crosshair and wherein said position sensitive detector array outputs position data of the first laser crosshair and the second laser crosshair; and
a metrology system processing unit, wherein said metrology system processing unit is connected with said position sensitive detector array and wherein said metrology system processing unit provides analog data processing of said position data;
wherein said first collimator and said position sensitive detector array are positioned at a main body of a spacecraft structure; and
wherein said second collimator and said mirror are positioned at the end of an antenna boom of a spacecraft structure.

18. The metrology system of claim 17, further comprising an optical fiber, wherein said optical fiber feeds said second laser beam to said second collimator, and wherein said optical fiber is positioned along said antenna boom.

19. The metrology system of claim 17, further comprising a power source, wherein said power source powers said laser.

20. The metrology system of claim 19, wherein said power source is selected from the group consisting of a battery and a small set of solar panels.

21. The metrology system of claim 17, wherein said mirror comprises a polished metal surface deposited on a glass substrate.

22. The metrology system of claim 17, wherein the size of said mirror is sufficient to reflect said first laser crosshair back to said position sensitive detector array.

23. The metrology system of claim 17, further comprising a distance measurement system, wherein said distance measurement system determines the distance between said position sensitive detector array and said mirror.

24. A metrology system, comprising:
a laser, wherein said laser alternately provides a first laser beam and a second laser beam;
a first collimator, wherein said first collimator receives said first laser beam from said laser and generates a first laser crosshair having a center point;
a first optical fiber, wherein said first optical fiber feeds said first laser beam to said first collimator;
a mirror, wherein said mirror receives and reflects said first laser crosshair;
a second collimator, wherein said second collimator receives said second laser beam from said laser and generates a second laser crosshair having a center point;
a second optical fiber, wherein said second optical fiber feeds said second laser beam to said second collimator;
a position sensitive detector array, wherein said position sensitive detector array alternately receives said first laser crosshair and said second laser crosshair and wherein said position sensitive detector array outputs position data of the first laser crosshair and the second laser crosshair; and
a metrology system processing unit, wherein said metrology system processing unit is connected with said position sensitive detector array and wherein said metrology system processing unit provides analog data processing of said position data;
a distance measurement system, wherein said distance measurement system determines the distance between said position sensitive detector array and said mirror;
wherein said laser, said first collimator, said position sensitive detector array, and said metrology system processing unit are positioned at a main body of a spacecraft structure;
wherein said first collimator and said position sensitive detector array are positioned at a reference point;
wherein said second collimator and said mirror are positioned at a point target at the end of an antenna boom of a spacecraft structure; and
wherein said second optical fiber is positioned along said antenna boom.

25. The metrology system of claim 24, wherein said metrology system processing unit calculates 6 degrees-of-freedom for said point target.

26. The metrology system of claim 24, wherein said metrology system processing unit comprises a sample-and-hold circuit, a first module, a second module, and a third module.

27. The metrology system of claim 26 wherein said first module evaluates the center point of said first laser cross hair and said second laser crosshair.

28. The metrology system of claim 26, wherein said second module calculates x translation, y translation, roll, pitch and yaw rotation of said point target.

29. The metrology system of claim 26, wherein said third module calculates the true twist of said point target.

* * * * *